US011697749B2

(12) United States Patent
Lee et al.

(10) Patent No.: US 11,697,749 B2
(45) Date of Patent: Jul. 11, 2023

(54) MULTILAYER ADHESIVE TAPE

(71) Applicant: LG Chem, Ltd., Seoul (KR)

(72) Inventors: Sle Lee, Daejeon (KR); Ho Kyung Song, Daejeon (KR); Jae Sung Hong, Daejeon (KR); Jun Man Choi, Daejeon (KR); Jang Soon Kim, Daejeon (KR)

(73) Assignee: Koza Novel Materials Korea Co., Ltd.

( * ) Notice: Subject to any disclaimer, the term of this patent is extended or adjusted under 35 U.S.C. 154(b) by 190 days.

(21) Appl. No.: 16/760,814

(22) PCT Filed: Nov. 2, 2018

(86) PCT No.: PCT/KR2018/013244
§ 371 (c)(1),
(2) Date: Apr. 30, 2020

(87) PCT Pub. No.: WO2019/088752
PCT Pub. Date: May 9, 2019

(65) Prior Publication Data
US 2021/0079269 A1   Mar. 18, 2021

(30) Foreign Application Priority Data
Nov. 3, 2017  (KR) .................. 10-2017-0146213

(51) Int. Cl.
*C09J 7/30*  (2018.01)
*C09J 7/10*  (2018.01)
(Continued)

(52) U.S. Cl.
CPC .................. *C09J 7/30* (2018.01); *C08F 2/50* (2013.01); *C08F 220/301* (2020.02); *C09J 7/10* (2018.01);
(Continued)

(58) Field of Classification Search
CPC ............ B32B 2405/00; B32B 2457/20; B32B 2457/202; C08F 2/50; C08F 220/1808;
(Continued)

(56) References Cited

U.S. PATENT DOCUMENTS

| 2008/0214079 A1 | 9/2008 | Harai et al. |
| 2010/0101723 A1 | 4/2010 | Okamoto et al. |

(Continued)

FOREIGN PATENT DOCUMENTS

| CN | 103635554 A | 3/2014 |
| CN | 103097483 B | 3/2016 |

(Continued)

OTHER PUBLICATIONS

Chinese Search Report for Application No. 201888006913.0, dated Jun. 28, 2021, 2 pages.
(Continued)

*Primary Examiner* — Eli D. Strah
(74) *Attorney, Agent, or Firm* — Lerner David LLP

(57) ABSTRACT

A multilayer adhesive tape is provided, including: a first outer adhesive layer; an intermediate adhesive layer; and a second outer adhesive layer sequentially. At least one of the first outer adhesive layer and the second outer adhesive layer includes a cured product of an outer adhesive composition including a high molecular weight prepolymer having a weight average molecular weight of 100,000 g/mol or more and 1,500,000 g/mol or less and a low molecular weight prepolymer having a weight average molecular weight of 1,000 g/mol or more and 80,000 g/mol or less.

15 Claims, 1 Drawing Sheet

(51) Int. Cl.
- *C09J 133/08* (2006.01)
- *C09J 133/10* (2006.01)
- *C08F 220/30* (2006.01)
- *C08F 2/50* (2006.01)

(52) U.S. Cl.
CPC ........... *C09J 133/08* (2013.01); *C09J 133/10* (2013.01); *B32B 2405/00* (2013.01); *B32B 2457/20* (2013.01); *B32B 2457/202* (2013.01); *C09J 2203/318* (2013.01); *C09J 2203/326* (2013.01); *C09J 2301/208* (2020.08); *C09J 2433/00* (2013.01); *C09K 2323/05* (2020.08); *C09K 2323/057* (2020.08)

(58) Field of Classification Search
CPC ... C08F 220/1811; C08F 220/301; C09J 7/00; C09J 7/10; C09J 7/30; C09J 133/08; C09J 133/10; C09J 133/14; C09J 2203/318; C09J 2203/326; C09J 2301/208; C09J 2433/00; C09J 2301/312; C09K 2323/05; C09K 2323/057
See application file for complete search history.

(56) References Cited

U.S. PATENT DOCUMENTS

| | | |
|---|---|---|
| 2011/0070434 A1 | 3/2011 | Hirose et al. |
| 2012/0156456 A1 | 6/2012 | Niimi et al. |
| 2013/0177758 A1 | 7/2013 | Shigetomi et al. |
| 2014/0127503 A1 | 5/2014 | Shirai et al. |
| 2014/0302313 A1 | 10/2014 | Suwa et al. |
| 2015/0284601 A1 | 10/2015 | Yurt et al. |
| 2017/0121562 A1* | 5/2017 | Wang ....................... B32B 27/22 |
| 2019/0392737 A1* | 12/2019 | Du ........................... G06F 1/1652 |

FOREIGN PATENT DOCUMENTS

| | | | | |
|---|---|---|---|---|
| CN | 106916540 A | | 7/2017 | |
| CN | 107216819 A | * | 9/2017 | ................ C09J 7/00 |
| JP | 2006144014 A | | 6/2006 | |
| JP | 2008285657 A | | 11/2008 | |
| JP | 2009013361 A | * | 1/2009 | |
| JP | 2009256607 A | | 11/2009 | |
| JP | 2013040256 A | | 2/2013 | |
| JP | 2014145023 A | * | 8/2014 | |
| JP | 2014145023 A | | 8/2014 | |
| JP | 2016505668 A | | 2/2016 | |
| KR | 20060055755 A | | 5/2006 | |
| KR | 20080007597 A | | 1/2008 | |
| KR | 20140003157 A | | 1/2014 | |
| KR | 20150065684 A | | 6/2015 | |
| KR | 20160025050 A | | 3/2016 | |
| KR | 20160035704 A | | 4/2016 | |
| KR | 20160083583 A | | 7/2016 | |
| KR | 20170045117 A | * | 4/2017 | ............ C08F 220/14 |
| KR | 20170045117 A | | 4/2017 | |
| KR | 20170115226 A | * | 10/2017 | ............. C09J 11/06 |
| KR | 20170115226 A | | 10/2017 | |
| KR | 20170115227 A | | 10/2017 | |
| WO | 2011129200 A1 | | 10/2011 | |
| WO | WO-2017066363 A1 | * | 4/2017 | ............. C09J 11/06 |

OTHER PUBLICATIONS

International Search Report from Application No. PCT/KR2018/013244 dated Mar. 26, 2019, 2 pages.

Taiwan Search Report for Application No. 107138979 dated Jun. 19, 2019, 1 page.

* cited by examiner

MULTILAYER ADHESIVE TAPE

CROSS-REFERENCE TO RELATED APPLICATIONS

The present application is a national stage entry under 35 U.S.C. § 371 of International Application No. PCT/KR2018/013244 filed on Nov. 2, 2018, which claims priority to 10-2017-0146213 filed in the Korean Patent Office on Nov. 3, 2017, the entire contents of which are incorporated by reference in their entirety.

TECHNICAL FIELD

The present invention relates to a multilayer adhesive tape.

BACKGROUND ART

Various members can be attached to the electronic device by means of the adhesive. For example, various optical members such as polarizing plates, phase difference plates, optical compensation films and reflective sheets can be attached to the liquid crystal display (LCD) by means of adhesive tape. Further, various members such as conductive membranes and glass bases can be attached to the touch screen panel by means of adhesive tape.

Recently, as the performance of devices using adhesive tape is improved, the property required for the adhesive tape is becoming demanding. To be concrete, some fields are requiring the excellent durable and semi-permanent adhesive performance according to the high temperature fluctuation, and some fields are requiring the rework in which there is no residue and no broken adhesive tape when removing the adhesive tape for the reconstruction.

In particular, if the adhesive tape is attached to members with the step difference, it is required to have the property which restrains the occurrence of the delay bubbles that occur being exfoliated from the members due to the recovery nature of adhesive tape.

It is necessary to conduct researches on the adhesive tape appropriate for these improved requirements.

DETAILED DESCRIPTION OF THE INVENTION

Technical Problem

The present invention is to provide a multilayer adhesive tape.

However, the present invention is not limited to the above-mentioned problems, and other problems that are not mentioned can be clearly understood by those skilled in the art from the following description.

Technical Solution

One embodiment of the present invention provides a multilayer adhesive tape sequentially including: a first outer adhesive layer; an intermediate adhesive layer; and a second outer adhesive layer, in which at least one of the first outer adhesive layer and the second outer adhesive layer includes a cured product of an outer adhesive composition including a high molecular weight prepolymer having a weight average molecular weight of 100,000 g/mol or more and 1,500,000 g/mol or less and a low molecular weight prepolymer having a weight average molecular weight of 1,000 g/mol or more and 80,000 g/mol or less.

Advantageous Effects

The adhesive tape according to one embodiment of the present invention has an advantage that it has an excellent adhesive strength to an adherend having a step difference.

The adhesive tape according to one embodiment of the present invention has an advantage that it can be easily removed when reworking.

The adhesive tape according to one embodiment of the present invention can facilitate rework of the adherend by minimizing the amount of the adhesive tape residue on the adherend even when removing the tape after adhering to the adherend.

The adhesive tape according to one embodiment of the present invention has an advantage of excellent durability at high temperature and high humidity.

EXPLANATION OF REFERENCE NUMERALS AND SYMBOLS

Figure 1:
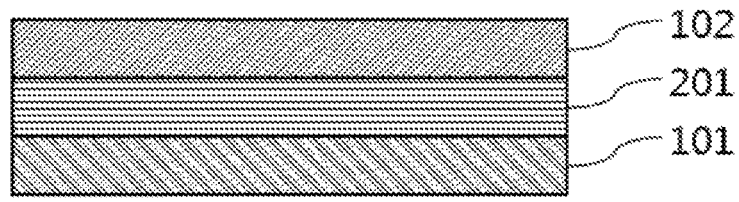
FIG. 1 is a schematic view of a laminated structure of a multilayer adhesive tape according to one embodiment of the present application.

101: first outer adhesive layer
102: second outer adhesive layer
201: intermediate adhesive layer
301: first interface mixed layer
302: second interface mixed layer

BEST MODE

In this specification, unless otherwise explicitly specified, the term "including" any components in one element refers to the inclusion of other components rather than the exclusion of other components.

In this specification, the term "polymerized unit of monomers" may mean a form in which the monomers undergo a polymerization reaction to form the polymer's backbone, for example, a main chain or a side chain.

In this specification, the unit "parts by weight" may mean the ratio of the weight between respective components.

In this specification, the term "A and/or B" may mean "A and B" or "A or B."

In this specification, the term "weight average molecular weight" may be a calculated value with respect to polystyrene measured by gel permeation chromatography (GPC).

In this specification, the glass transition temperature (Tg) may be a value determined as the midpoint of the DSC curve in which the object is raised at a heating rate of 5° C./minute in a temperature range of −70° C. or more and 100° C. or less and is measured using DSC (differential scanning calorimeter) (Q-1000, TA Instrument).

In this specification, thickness of a member may be an average value of any ten measured values obtained by observing the cross section of the member with an electron microscope (SEM, TEM, STEM). When the thickness of the member is very thin, it is possible to enlarge and measure the photographs observed at high magnification. At the enlargement, it is possible to measure the interlayer interfacial line using the center portion bisecting the width direction as a boundary line.

In this specification, (meth)acrylate may mean acrylate or methacrylate.

In this specification, the alkyl group may include an alkyl group having 1 to 20 carbon atoms.

In this specification, the heterocycloalkyl group may include a cyclic structure which contains a hetero element other than carbon without the unsaturated bond in the functional group, and may include a monocyclic ring or a polycyclic ring having 2 to 20 carbon atoms.

In this specification, the cycloalkyl group may include a carbon cyclic ring without the unsaturated bond in the functional group, and may include a monocyclic ring or polycyclic ring having 3 to 20 carbon atoms.

Hereinafter, the present invention will be described in more detail.

One embodiment of the present invention provides a multilayer adhesive tape sequentially including: a first outer adhesive layer; an intermediate adhesive layer; and a second outer adhesive layer, in which at least one of the first outer adhesive layer and the second outer adhesive layer includes a cured product of an outer adhesive composition including a high molecular weight prepolymer having a weight average molecular weight of 100,000 g/mol or more and 1,500,000 g/mol or less and a low molecular weight prepolymer having a weight average molecular weight of 1,000 g/mol or more and 80,000 g/mol or less.

FIG. 1 is a schematic view of a laminated structure of a multilayer adhesive tape according to one embodiment of the present invention. Specifically, according to FIG. 1, it is illustrated that the first outer adhesive layer 101, the intermediate adhesive layer 201 and the second outer adhesive layer 102 are sequentially laminated.

According to one embodiment of the present invention, each of the first outer adhesive layer and the second outer adhesive layer may include a cured product of an outer adhesive composition including a high molecular weight prepolymer having a weight average molecular weight of 100,000 g/mol or more and 1,500,000 g/mol or less and a low molecular weight prepolymer having a weight average molecular weight of 1,000 g/mol or more and 80,000 g/mol or less.

According to one embodiment of the present invention, the first outer adhesive layer and/or the second outer adhesive layer include a cured product of the outer adhesive composition, thereby improving the step coverage of the multilayer adhesive tape. Specifically, the first outer adhesive layer and/or the second outer adhesive layer may be easily adjusted to a low glass transition temperature using the low molecular weight prepolymer, resulting in the improvement of the step coverage and the adhesive strength to the adherend of the multilayer adhesive tape. Further, the first outer adhesive layer and/or the second outer adhesive layer use the low molecular weight prepolymer, thereby minimizing deterioration of the die cutting performance of the multilayer adhesive tape and reducing the residue on the adherend when removing the multilayer adhesive tape for rework.

According to one embodiment of the present invention, the high molecular weight prepolymer may have a weight average molecular weight of 100,000 g/mol or more and 1,500,000 g/mol or less, 200,000 g/mol or more and 1,000,000 g/mol or less, 200,000 g/mol or more and 800,000 g/mol or less, 200,000 g/mol or more and 700,000 g/mol or less, or 300,000 g/mol or more and 600,000 g/mol or less.

The high molecular weight prepolymer may serve to impart adhesiveness to the first outer adhesive layer and/or the second outer adhesive layer.

When the weight average molecular weight of the high molecular weight prepolymer thereof is within the range as described above, the first outer adhesive layer and/or the second outer adhesive layer may have excellent adhesive properties.

According to one embodiment of the present invention, the high molecular weight prepolymer may be a high molecular weight acrylic-based prepolymer.

When the weight average molecular weight of the high molecular weight prepolymer thereof is within the range as described above, the durability of the first outer adhesive layer and/or the second outer adhesive layer can be easily controlled. Furthermore, when the weight average molecular weight of the high molecular weight prepolymer thereof is within the range as described above, it may contribute to an improvement in reliability at high temperature and/or high humidity of the first outer adhesive layer and/or the second outer adhesive layer.

According to one embodiment of the present invention, the low molecular weight prepolymer may have a weight average molecular weight of 1,000 g/mol or more and 80,000 g/mol or less, 5,000 g/mol or more and 80,000 g/mol or less, 10,000 g/mol or more and 80,000 g/mol or less, 20,000 g/mol or more and 80,000 g/mol or less, 20,000 g/mol or more and 60,000 g/mol or less, 30,000 g/mol or more and 80,000 g/mol or less, 30,000 g/mol or more and 60,000 g/mol or less, 30,000 g/mol or more and 50,000 g/mol or less, 40,000 g/mol or more and 60,000 g/mol or less, or 40,000 g/mol or more and 50,000 g/mol or less.

The low molecular weight prepolymer may serve to control flexibility and glass transition temperature of the first outer adhesive layer and/or the second outer adhesive layer.

When the weight average molecular weight of the low molecular weight prepolymer thereof is within the range as described above, the first outer adhesive layer and/or the second outer adhesive layer may have excellent step coverage.

According to one embodiment of the present invention, the low molecular weight prepolymer may be a low molecular weight acrylic-based prepolymer.

When the weight average molecular weight of the low molecular weight prepolymer thereof is within the range as described above, the flexibility of the first outer adhesive layer and/or the second outer adhesive layer can be easily controlled. Specifically, when the weight average molecular weight of the low molecular weight prepolymer thereof is within the range as described above, the glass transition temperature of the first outer adhesive layer and/or the second outer adhesive layer can be easily controlled, thereby easily improving the step coverage of the first outer adhesive layer and/or the second outer adhesive. Furthermore, when the weight average molecular weight of the low molecular weight prepolymer thereof is within the range as described above, the first outer adhesive layer and/or the second outer adhesive layer are formed at a proper curing speed, during preparing the first outer adhesive layer and/or the second outer adhesive layer, thereby securing physical properties such as the step coverage of the first outer adhesive layer and/or the second outer adhesive layer.

According to one embodiment of the present invention, the glass transition temperature of the low molecular weight prepolymer may be 0° C. or more and 80° C. or less. Specifically, according to one embodiment of the present invention, the glass transition temperature of the low molecular weight prepolymer may be 20° C. or more and 60° C. or less, 30° C. or more and 60° C. or less or 40° C. or more and 50° C. or less.

When the glass transition temperature of the low molecular weight prepolymer thereof is within the range as described above, the glass transition temperature of the first outer adhesive layer and/or the second outer adhesive layer can be easily controlled, thereby easily improving the reworkability and die cutting performance of the multilayer adhesive tape.

According to one embodiment of the present invention, the low molecular weight prepolymer may include polymerized units of a photopolymerizable functional group-containing (meth)acrylate monomer.

According to one embodiment of the present invention, the photopolymerizable functional group may be a hydrogen abstraction type. Specifically, the photopolymerizable functional group may include an ester bond (—COO—), and the ester bond may be decomposed into an oxygen radical and a carbon radical upon curing of the adhesive composition. More specifically, the oxygen radical can dissociate the bond between hydrogen and carbon from one side of the acrylate monomer so that the hydrogen radical may be released from the acrylate monomer, thereby producing the acrylate monomer containing a carbon radical. Further, the oxygen radical of the photopolymerizable functional group may be combined with a hydrogen radical released from the acrylate monomer, thereby forming a hydroxy group. During curing of the adhesive composition, the carbon radical of the photopolymerizable functional group may react with the carbon radical of the acrylate monomer to form a single bond.

According to one embodiment of the present invention, a content of the polymerized units of the photopolymerizable functional group-containing (meth)acrylate monomer may be 0.01 part by weight or more and 10 parts by weight or less with respect to 100 parts by weight of total polymerized units of the low molecular weight prepolymer. Specifically, a content of the polymerized units of the photopolymerizable functional group-containing (meth)acrylate monomer may be 0.01 part by weight or more and 8 parts by weight or less, 0.01 part by weight or more and 5 parts by weight or less, 0.1 part by weight or more and 10 parts by weight or less, 0.1 part by weight or more and 8 parts by weight or less, 0.1 part by weight or more and 5 parts by weight or less, 0.5 parts by weight or more and 10 parts by weight or less, 0.5 parts by weight or more and 8 parts by weight or less, or 0.5 parts by weight or more and 5 parts by weight or less with respect to 100 parts by weight of total polymerized units of the low molecular weight prepolymer.

The polymerized unit of the photopolymerizable functional group-containing (meth)acrylate monomers can facilitate the crosslinking between the low molecular weight prepolymer and the high molecular weight prepolymer. When the polymerized unit of the photopolymerizable functional group-containing (meth)acrylate monomers is included in the low molecular weight prepolymer within the range as described above, the crosslinking between the low molecular weight prepolymer and the high molecular weight prepolymer can be more easily controlled, and the physical properties of the first outer adhesive layer and/or the second outer adhesive layer can be stably realized.

According to one embodiment of the present invention, the photopolymerizable functional group-containing (meth)acrylate monomer is a (meth)acrylatemonomer having at least one photopolymerizable functional group selected from the group consisting of a benzophenone-based functional group, a quinone-based functional group and a thioxanthone-based functional group bonded.

According to one embodiment of the present invention, the benzophenone-based functional group may be a functional group contained in at least one compound selected from the group consisting of benzophenone, benzoyl benzoic acid, benzoyl benzoic acid methyl ether, 4-phenylbenzophenone, hydroxy benzophenone, 4-benzoyl-4'-methyldiphenylsulfide and 3,3'-methyl-4-methoxybenzophenone.

According to one embodiment of the present invention, the quinone-based functional group may be a functional group contained in at least one compound selected from the group consisting of quinone, anthraquinone, 2-methyl anthraquinone, 2-ethyl anthraquinone, t-butyl anthraquinone and 2,6-dichloro-9,10-anthraquinone.

According to one embodiment of the present invention, the thioxanthone-based functional group may be a functional group contained in at least one compound selected from the group consisting of thioxanthone, 2-chlorothioxanthone, 2-methylthioxanthone, 2,4-dimethylthioxanthone and isopropylthioxanthone.

According to one embodiment of the present invention, the photopolymerizable functional group-containing (meth)acrylatemonomer may be such that a leaving group bonded to the oxygen with the single bond of the (meth)acrylatemonomer is substituted with the photopolymerizable functional group. Specifically, the photopolymerizable functional group-containing (meth)acrylatemonomer may be benzophenone (meth)acrylate.

According to one embodiment of the present invention, the low molecular weight prepolymer may include at least one polymerized unit of (meth)acrylatemonomers selected from the group consisting of a polymerized unit of an alkyl group-containing (meth)acrylatemonomers, a polymerized unit of cycloalkyl group-containing (meth)acrylatemonomers and a polymerized unit of heterocycloalkyl group-containing (meth)acrylate monomers and a polymerized unit of polar functional group-containing monomers.

Further, according to one embodiment of the present invention, the low molecular weight prepolymer may include at least one polymerized unit of (meth)acrylate monomers selected from the group consisting of a polymerized unit of alkyl group-containing (meth)acrylate monomers, a polymerized unit of cycloalkyl group-containing (meth)acrylate monomers and a polymerized unit of heterocycloalkyl group-containing (meth)acrylate monomers, a polymerized unit of the photopolymerizable functional group-containing (meth)acrylate monomers and the polymerized unit of polar functional group-containing monomers.

According to one embodiment of the present invention, the low molecular weight prepolymer may be copolymer of at least one (meth)acrylate monomer selected from the group consisting of an alkyl group-containing (meth)acrylate monomer, a cycloalkyl group-containing (meth)acrylate monomer and a heterocycloalkyl group-containing (meth)acrylate monomer and a polar functional group-containing monomer.

Further, according to one embodiment of the present invention, the low molecular weight prepolymer may be copolymer of at least one (meth)acrylate monomer selected from the group consisting of an alkyl group-containing (meth)acrylate monomer, a cycloalkyl group-containing (meth) acrylate monomer and a heterocycloalkyl group-containing (meth)acrylate monomer, the photopolymerizable functional group-containing (meth)acrylate monomer and the polar functional group-containing monomer.

According to one embodiment of the present invention, the low molecular weight prepolymer may include a polymerized unit of alkyl group-containing (meth)acrylate monomers, a polymerized unit of cycloalkyl group-containing (meth)acrylate monomers and a polymerized unit of polar functional group-containing monomers.

According to one embodiment of the present invention, in the low molecular weight prepolymer, a content of the polymerized unit of the cycloalkyl group-containing (meth)acrylate monomer may be 50 parts by weight or more and 90 parts by weight or less, 60 parts by weight or more and 90 parts by weight or less, or 70 parts by weight or more and 90 parts by weight or less with respect to 100 parts by weight of total polymerized units of the low molecular weight prepolymer.

According to one embodiment of the present invention, in the low molecular weight prepolymer, a content of the polymerized unit of the polar functional group-containing monomers may be 10 parts by weight or more and 40 parts by weight or less, 10 parts by weight or more and 30 parts by weight or less, or 10 parts by weight or more and 20 parts by weight or less with respect to 100 parts by weight of total polymerized units of the low molecular weight prepolymer.

In the low molecular weight prepolymer, a content of the polymerized unit of the cycloalkyl group-containing (meth)acrylate monomers and a content of the polymerized unit of the polar functional group-containing monomers can be controlled with the range as described above, thereby adjusting the glass transition temperature thereof.

According to one embodiment of the present invention, the low molecular weight prepolymer may be prepared by solution polymerization of a composition including at least one monomer. However, the present invention is not limited thereto, and a polymerization method commonly used in the art can be used for preparing low molecular weight prepolymer.

According to one embodiment of the present invention, a content of the low molecular weight prepolymer may 1 part by weight or more and 25 parts by weight or less with respect to 100 parts by weight of the high molecular weight prepolymer. Specifically, according to one embodiment of the present invention, the content of the low molecular weight prepolymer may be 1 part by weight or more and 20 parts by weight or less, 1 part by weight or more and 15 parts by weight or less, or 5 parts by weight or more and 10 parts by weight or less with respect to 100 parts by weight of the high molecular weight prepolymer.

When the content of the low molecular weight prepolymer is within the range as described above, the first and/or second outer adhesive layer of the multilayer adhesive tape may have an appropriate adhesive strength to improve the step coverage and the adhesive performance of the multilayer adhesive tape. Furthermore, when the multilayer adhesive tape is removed, the residue on the adherend can be minimized, thereby significantly improving the reworkability thereof.

According to one embodiment of the present invention, the high molecular weight prepolymer may include at least one polymerized unit of (meth)acrylate monomers selected from the group consisting of a polymerized unit of alkyl group-containing (meth)acrylate monomers and a polymerized unit of heterocycloalkyl group-containing (meth)acrylate monomers and a polymerized unit of polar functional group-containing monomers.

According to one embodiment of the present invention, in the high molecular weight prepolymer, a content of the polymerized unit of the alkyl group-containing (meth)acrylate monomers may be 50 parts by weight or more and 98 parts by weight or less, 70 part by weight or more and 98 parts by weight or less, 80 parts by weight or more and 95 parts by weight or less, or 90 parts by weight or more and 95 parts by weight or less with respect to 100 parts by weight of total polymerized units of the high molecular weight prepolymer.

According to one embodiment of the present invention, in the high molecular weight prepolymer, a content of the polymerized unit of the heterocycloalkyl group-containing (meth)acrylate monomers may be 1 parts by weight or more and 15 parts by weight or less, or 5 parts by weight or more and 15 parts by weight or less with respect to 100 parts by weight of total polymerized units of the high molecular weight prepolymer.

According to one embodiment of the present invention, in the high molecular weight prepolymer, a content of the polymerized unit of the polar functional group-containing monomers may be more than 0 part by weight and 20 parts by weight or less, more than 0 part by weight and 10 parts by weight or less, 1 part by weight or more and 10 parts by weight or less, or 3 parts by weight or more and 7 parts by weight or less with respect to 100 parts by weight of total polymerized units of the high molecular weight prepolymer.

According to one embodiment of the present invention, the high molecular weight prepolymer may be prepared by solution polymerization of a composition including at least one (meth)acrylate monomer selected from the group consisting of an alkyl group-containing (meth)acrylate monomer and a heterocycloalkyl group-containing (meth)acrylate monomer; and a polar functional group-containing monomer. However, the present invention is not limited thereto, and a polymerization method commonly used in the art can be used for preparing the high molecular weight prepolymer.

According to one embodiment of the present invention, the crosslinking reaction of the outer adhesive composition is induced to cure the composition, forming the first outer adhesive layer and/or the second outer adhesive layer. Specifically, the first outer adhesive layer and/or the second outer adhesive layer may be formed by solution polymerization of the outer adhesive composition. A method known in the art can be used to cure the adhesive composition, forming the first outer adhesive layer and/or the second outer adhesive layer.

The glass transition temperature of the first outer adhesive layer and the second outer adhesive layer may be −60° C. or more and −20° C. or less, respectively.

According to one embodiment of the present invention, the outer adhesive composition may further include at least one of a photoinitiator, a thermal initiator and a curing agent.

Those commonly known in the art can be exemplified as the kind of the photoinitiator and the heat initiator.

The curing agent may be an acrylate-based curing agent or the like which is commonly known in the art.

According to one embodiment of the present invention, the glass transition temperature of the intermediate adhesive layer may be −40° C. or more and 0° C. or less. Specifically, according to one embodiment of the present invention, the glass transition temperature of the intermediate adhesive layer may be −40° C. or more and −15° C. or less, −40° C. or more and −20° C. or less, or −35° C. or more and −25° C. or less.

When the glass transition temperature of the intermediate adhesive layer satisfies the range as described above, the die cutting performance and handling of the multilayer adhesive tape can be improved.

Furthermore, when the glass transition temperature of the intermediate adhesive layer is within the above as described above, the multilayer adhesive tape can be easily removed without breaking when the multilayer adhesive tape is removed for rework. In other words, the glass transition temperature of the intermediate adhesive layer is within the range as described above, thereby improving the reworkability of the multilayer adhesive tape.

The intermediate adhesive layer may include an intermediate adhesive polymer. According to one embodiment of the present invention, the intermediate adhesive polymer may include a polymerized unit of alkyl group-containing (meth)acrylate monomers, a polymerized unit of cycloalkyl group-containing (meth)acrylate monomers and a polymerized unit of polar functional group-containing monomers.

According to one embodiment of the present invention, in the intermediate adhesive layer, a content of the polymerized unit of the alkyl group-containing (meth)acrylate monomers may be 30 parts by weight or more and 90 parts by weight or less, 50 parts by weight or more and 85 parts by weight or less, or 60 parts by weight or more and 85 parts by weight or less with respect to 100 parts by weight of total polymerized units of the intermediate adhesive polymer.

According to one embodiment of the present invention, in the intermediate adhesive layer, a content of the polymerized unit of the cycloalkyl group-containing (meth)acrylate monomers may be more than 0 part by weight and 30 parts by weight or less with respect to 100 parts by weight of total polymerized units of the intermediate adhesive polymer. Specifically, in the intermediate adhesive layer, a content of the polymerized unit of the cycloalkyl group-containing (meth)acrylate monomers may be 5 parts by weight or more and 30 parts by weight or less, or 5 parts by weight or more and 15 parts by weight or less with respect to 100 parts by weight of total polymerized units of the intermediate adhesive polymer.

When the content of the polymerized unit of the cycloalkyl group-containing (meth)acrylate monomers in the intermediate adhesive layer is within the range as described above, there is an advantage that the adhesive strength of the multilayer adhesive tape can be suitably realized and high step coverage can be secured. Further, when the content of the polymerized unit of the cycloalkyl group-containing (meth)acrylate monomers is within the range as described above, the reworkability of the multilayer adhesive tape can be improved. Specifically, when the content of the polymerized unit of the cycloalkyl group-containing (meth)acrylate monomers is within the range as described above, the appropriate strength of the multilayer adhesive tape can be maintained so that the tape can be easily removed when rework is required.

Further, when the content of the polymerized unit of the cycloalkyl group-containing (meth)acrylate monomers in the intermediate adhesive layer is within the range as described above, the intermediate adhesive composition can be easily applied and cured, and the occurrence of the delayed bubble of the intermediate adhesive layer can be minimized. Specifically, when the content of the polymerized unit of the cycloalkyl group-containing (meth)acrylate monomers exceeds 30 parts by weight, there is a risk that the delayed bubble of the intermediate adhesive layer is rapidly increased.

According to one embodiment of the present invention, in the intermediate adhesive layer, a content of the polymerized unit of the polar functional group-containing monomers may be more than 0 part by weight and 20 parts by weight or less with respect to 100 parts by weight of total polymerized units of the intermediate adhesive polymer. Specifically, in the intermediate adhesive composition, the content of the polymerized unit of the polar functional group-containing monomers may be 5 parts by weight or more and 20 parts by weight or less, or 5 parts by weight or more and 15 parts by weight or less with respect to 100 parts by weight of total polymerized units of the intermediate adhesive polymer.

When the content of the polymerized unit of the polar functional group-containing monomer in the intermediate adhesive layer is within the range as described above, there is an advantage that the reworkability and the step coverage of the multilayer adhesive tape can be realized at an appropriate level at the same time. Specifically, when the content of the polymerized unit of the polar functional group-containing monomers is excessively high, the cohesive force of the intermediate adhesive layer becomes high so that the reworkability of the multilayer adhesive tape becomes high, but the step coverage may deteriorate.

Further, when the content of the polymerized unit of the polar functional group-containing monomers in the intermediate adhesive layer is within the range as described above, the intermediate adhesive layer can secure an appropriate cohesive force. Accordingly, when the content of the polymerized unit of the polar functional group-containing monomers is within the range as described above, the step coverage and the die cutting performance of the multilayer adhesive tape can be effectively improved, and it is possible to minimize the occurrence of delayed bubbles generating after a certain time elapses after the multilayer adhesive tape is adhered to the adherend.

According to one embodiment of the present invention, the alkyl group-containing (meth)acrylate monomer may be a (meth)acrylate having an alkyl group having 1 to 20 carbon atoms. Specifically, the alkyl group-containing (meth)acrylate monomer may include at least one selected from the group consisting of methacrylate, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth) acrylate, pentyl (meth) acrylate, 2-ethylhexyl (meth) acrylate, 2-ethylbutyl (meth) acrylate, n-octyl (meth)acrylate, and isooctyl (meth)acrylate.

According to one embodiment of the present invention, the cycloalkyl group-containing (meth)acrylate monomer may include at least one selected from the group consisting of cyclohexyl acrylate (CHA), cyclohexyl methacrylate (CHMA), isobornyl acrylate (IBOA), isobornyl methacrylate (IBOMA), isobornyl methyl (meth)acrylate and 3,3,5-trimethylcyclohexylacrylate (TMCHA).

According to one embodiment of the present invention, the heterocycloalkyl group-containing (meth)acrylate monomer may include at least one selected from the group consisting of tetrahydrofurfuryl (meth)acrylate (THFA), tetrahydropyranyl (meth)acrylate (THPA), acryloyl morpholine and cyclictrimethylol-propaneformal (meth) acrylate (CTFA).

According to one embodiment of the present invention, the polar functional group-containing monomer may include at least one selected from the group consisting of a hydroxyl group-containing monomer, a carboxyl group-containing monomer and a nitrogen-containing monomer.

According to one embodiment of the present invention, the hydroxy group-containing monomer may be at least one selected from the group consisting of 2-hydroxyethyl (meth) acrylate, 2-hydroxypropyl (meth)acrylate, 4-hydroxybutyl (meth)acrylate, 6-hydroxyhexyl (meth)acrylate, 8-hydroxyoctyl (meth) acrylate, 2-hydroxyethylene glycol (meth)acrylate and 2-hydroxypropylene glycol (meth)acrylate.

According to one embodiment of the present invention, the carboxyl group-containing monomer may be at least one selected from the group consisting of acrylic acid, methacrylic acid, 2-carboxyethyl acrylic acid, 3-carboxypropyl acrylic acid, 2-(meth) acryloyl oxyacetic acid, 3-(meth) acryloyl oxypropyl acid, 4-(meth) acryloyloxy butyric acid, acrylic acid dimer, itaconic acid and maleic acid.

According to one embodiment of the present invention, the nitrogen-containing monomer may be at least one selected from the group consisting of 2-isocyanatoethyl (meth) acrylate, 3-isocyanatopropyl (meth) acrylate, 4-isocyanatobutyl (meth)acrylate, (meth) acrylamide, N-vinylpyrrolidone, dimethyl acrylamide and N-vinylcaprolactam.

According to one embodiment of the present invention, thickness of the intermediate adhesive layer may be 30 μm or more and 100 μm or less. Specifically, according to one embodiment of the present invention, the thickness of the intermediate adhesive layer may be 40 μm or more and 80 μm or less, or 50 μm or more and 60 μm or less.

When the thickness of the intermediate adhesive layer is within the range as described above, the multilayer adhesive tape shows appropriate hardness, thereby realizing excellent reworkability and step coverage. Further, when the thickness of the intermediate adhesive layer is out of the range as described above, the hardness of the multilayer adhesive tape becomes too high, thereby having a risk of decreasing the step coverage.

According to one embodiment of the present invention, a thickness of the first outer adhesive layer and the second outer adhesive layer may be 25 μm or more and 60 μm or less, respectively. Specifically, according to one embodiment of the present invention, a thickness of the first outer adhesive layer and the second outer adhesive layer may be 25 μm or more and 50 μm or less, respectively.

When thickness of the first outer adhesive layer and the second outer adhesive layer is within the range as described above, the step coverage can be improved. Further, when the thickness of the first outer adhesive layer and the second outer adhesive layer is out of the range as described above, there is a risk that the reworkability is lowered and the long-term durability is decreased due to the low cohesive force.

According to one embodiment of the present invention, the total thickness of the multilayer adhesive tape may be 100 μm or more and 250 μm or less. Specifically, the total thickness of the multilayer adhesive tape may be 100 μm or more and 200 μm or less, or 120 μm or more and 170 μm or less.

When the total thickness of the multilayer adhesive tape is within the range as described above, it is possible to simultaneously satisfy both high adhesiveness and step coverage in spite of the thin thickness. Furthermore, the high reworkability thereof can be realized.

According to one embodiment of the present invention, the first outer adhesive layer and the second outer adhesive layer may be formed using a composition having the same elements. Further, according to one embodiment of the present invention, the thicknesses of the first outer adhesive layer and the second outer adhesive layer may be the same.

According to one embodiment of the present invention, the thickness ratio of the first outer adhesive layer and the intermediate adhesive layer and the thickness ratio of the second outer adhesive layer and the intermediate adhesive layer, respectively, may be 1:4 to 2:1. Specifically, according to one embodiment of the present invention, the thickness ratio of the first outer adhesive layer and the intermediate adhesive layer and the thickness ratio of the second outer adhesive layer and the intermediate adhesive layer, respectively, may be 1:0.7 to 1:2 or 1:0.7 to 1:1.5.

When the thickness ratio of the intermediate adhesive layer to each of the first outer adhesive layer and the second outer adhesive layer is within the range as described above, there is an advantage to secure excellent the step coverage and to carry out excellent reworkability. When the thickness ratio of the intermediate adhesive layer to the first or second outer adhesive layer is out of the range as described above and then the thickness ratio of the outer adhesive layer is large, the thickness ratio of the relatively soft outer adhesive layer becomes too high so that there is a risk that the reworkability are lowered at the time of processing. Further, when the thickness ratio of the intermediate adhesive layer to the first or second outer adhesive layer is out of the range as described above and then the thickness ratio of the intermediate adhesive layer is large, the thickness ratio of the relatively hard intermediate adhesive layer becomes too high so that there is risk that the step coverage is lowered.

According to one embodiment of the present invention, the multilayer adhesive tape may include: a first interface mixed layer provided between the first outer adhesive layer and the intermediate adhesive layer; and a second interface mixed layer provided between the second outer adhesive layer and the intermediate adhesive layer.

Specifically, according to one embodiment of the present invention, the first interface mixed layer may include both a material constituting the first outer adhesive layer and a material constituting the intermediate adhesive layer, and the second interface mixed layer may include both a material constituting the second outer adhesive layer and a material constituting the intermediate adhesive layer.

Figure 2:
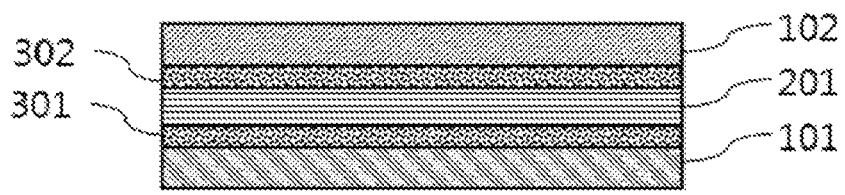
FIG. 2 is a schematic view of a laminated structure of a multilayer adhesive tape according to one embodiment of the present application.

FIG. 2 is a schematic view illustrating a laminated structure of a multilayer adhesive tape according to one embodiment of the present invention. According to FIG. 2, it is illustrated that the first interface mixed layer 301 is provided between the first outer adhesive layer 101 and the intermediate adhesive layer 201 and the second interface mixed layer 302 is provided between the intermediate adhesive layer 201 and the second outer adhesive layer 102.

According to one embodiment of the present invention, the multilayer adhesive tape may be prepared by a method in which the first outer adhesive composition, the intermediate adhesive composition and the second outer adhesive composition are laminated sequentially and then are cured at the same time. According to one embodiment of the present invention, the multilayer adhesive tape may be prepared by a method in which the first outer adhesive composition, the intermediate adhesive composition and the second outer adhesive composition are laminated sequentially and then are photo-cured at the same time.

The first outer adhesive composition constitutes the first outer adhesive layer after curing, the intermediate adhesive composition constitutes the intermediate adhesive layer after curing, and the second outer adhesive composition constitutes the second outer adhesive layer after curing.

Specifically, the multilayer adhesive tape is prepared by a method in which the liquid compositions are laminated and then are cured at the same time, instead of separately preparing each layer and then bonding them together, so that liquid mixed sections may occur between the respective layers. Such a liquid mixed section results in an excellent interlaminar adhesive strength compared to typical multilayer adhesive tapes, and the interlayer interface separation phenomenon can be prevented even in a cryogenic temperature environment.

According to one embodiment of the present invention, the interface between the first outer adhesive composition and the intermediate adhesive composition, and the interface between the intermediate adhesive composition and the second outer adhesive composition, respectively, may have interfacial layers due to liquid mixing. Specifically, the interfacial layer due to the liquid mixing at the interface between the first outer adhesive composition and the intermediate adhesive composition may be cured to constitute the first interface mixed layer. Further, the interfacial layer due to the liquid mixing at the interface between the intermediate adhesive composition and the second outer adhesive composition may be cured to constitute the second interface mixed layer.

According to one embodiment of the present invention, the first outer adhesive composition, the intermediate adhesive composition and the second outer adhesive composition may be sequentially applied on a substrate. Further, the first outer adhesive composition, the intermediate adhesive composition and the second outer adhesive composition may be sequentially applied on a substrate at the same time. The application method may be one commonly used in the art such as a slot-die and a lip-die.

According to one embodiment of the present invention, the thickness of the intermediate adhesive layer may be a distance from the center of the first interface mixed layer to the center of the second interface mixed layer. Further, the thickness of the first outer adhesive layer may be a distance from the center of the first interface mixed layer to the outer surface of the first outer adhesive layer. Further, the thickness of the second outer adhesive layer may be a distance from the center of the second interface mixed layer to the outer surface of the second outer adhesive layer.

According to one embodiment of the present invention, the multilayer adhesive tape may be formed by a method of curing the intermediate adhesive composition and the outer adhesive composition, respectively, into films, and then laminating process. Specifically, the first outer adhesive layer, the intermediate adhesive layer and the second outer adhesive layer may be separately formed into films. Further, the films may be laminated sequentially, and then pressed to produce the multilayer adhesive tape.

However, the present invention is not limited to the production methods and can be produced using a commonly used production method in the art.

The multilayer adhesive tape may be used for the attachment of various optical members such as a polarizing plate, a retardation plate, an optical compensation film, a reflection sheet, a protective film and a brightness improvement film. However, the present invention is not limited thereto and may be used without limitation for applications usable in the art.

Hereinafter, the present invention is described in detail with reference to Examples. However, Examples according to the present invention can be modified into various other forms, and the scope of the present invention is not construed as being limited to the following Examples. Examples of this specification are provided to more completely describe the present invention to those skilled in the art.

EMBODIMENTS FOR THE INVENTION

Preparation Example 1

Preparation of Low Molecular Weight Prepolymer 5 parts by weight of 2-ethylhexyl acrylate, 75 parts by weight of isobornyl acrylate, 20 parts by weight of hydroxyethyl acrylate and 2 parts by weight of benzophenone methacrylate were solution-polymerized to prepare a low molecular weight prepolymer having a weight average molecular weight of 40,000 g/mol and a glass transition temperature of 50° C.

Preparation Example 2

Preparation of Low Molecular Weight Prepolymer

The composition including 5 parts by weight of 2-ethylhexyl acrylate, 75 parts by weight of isobornyl acrylate, 20 parts by weight of hydroxyethyl acrylate and 2 parts by weight of benzophenone methacrylate was solution-polymerized to prepare a low molecular weight prepolymer having a weight average molecular weight of 50,000 g/mol and a glass transition temperature of 50° C.

Preparation Example 3

Preparation of Low Molecular Weight Prepolymer

The composition including 10 parts by weight of 2-ethylhexyl acrylate, 70 parts by weight of isobornyl acrylate, 20 parts by weight of hydroxyethyl acrylate and 2 parts by weight of benzophenone methacrylate was solution-polymerized to prepare a low molecular weight prepolymer having a weight average molecular weight of 50,000 g/mol and a glass transition temperature of 40° C.

Preparation Example 4

Preparation of Low Molecular Weight Prepolymer

The composition including 5 parts by weight of 2-ethylhexyl acrylate, 75 parts by weight of isobornyl acrylate, 20 parts by weight of hydroxyethyl acrylate and 2 parts by weight of benzophenone methacrylate was solution-polymerized to prepare a low molecular weight prepolymer having a weight average molecular weight of 500 g/mol and a glass transition temperature of 50° C.

Preparation Example 5

Preparation of Low Molecular Weight Prepolymer

The composition including 50 parts by weight of 2-ethylhexyl acrylate, 30 parts by weight of isobornyl acrylate, 20 parts by weight of hydroxyethyl acrylate and 2 parts by weight of benzophenone methacrylate was solution-polymerized to prepare a low molecular weight prepolymer having a weight average molecular weight of 40,000 g/mol and a glass transition temperature of −20° C.

Preparation Example 6

Preparation of Low Molecular Weight Prepolymer

The composition including 5 parts by weight of 2-ethylhexyl acrylate, 75 parts by weight of isobornyl acrylate, 20 parts by weight of hydroxyethyl acrylate and 2 parts by weight of benzophenone methacrylate was solution-polymerized to prepare a low molecular weight prepolymer having a weight average molecular weight of 100,000 g/mol and a glass transition temperature of 50° C.

Example 1

80 parts by weight of 2-ethylhexyl acrylate, 10 parts by weight of isobornyl methacrylate and 10 parts by weight of acrylic acid were solution-polymerized to prepare a high molecular weight prepolymer having a weight average molecular weight of 500,000 g/mol.

With respect to 100 parts by weight of the prepared high molecular weight prepolymer, 5 parts by weight of the low molecular weight prepolymer prepared in Preparation Example 1, an acrylate-based curing agent and a photoinitiator were mixed to prepare an outer adhesive composition.

Further, an intermediate adhesive composition including 80 parts by weight of 2-ethylhexyl acrylate, 10 parts by weight of isobornyl methacrylate and 10 parts by weight of acrylic acid was prepared. At this time, the glass transition temperature of the intermediate adhesive layer was about −30° C.

The outer adhesive composition, the intermediate adhesive composition and the outer adhesive composition, respectively, were sequentially applied at a thickness of 45 μm, 60 μm and 45 μm and cured simultaneously by UV irradiation, thereby preparing a multilayer adhesive tape sequentially provided with the first outer adhesive layer, the intermediate adhesive layer and the second outer adhesive layer.

Multilayer adhesive tapes of Examples 2 to 4 and Comparative Examples 1 to 7 were prepared in the same manner as in Example 1 except that the types and contents of the low molecular weight substances included in the outer adhesive composition were modified according to the following Table 1.

TABLE 1

| | Low molecular weight prepolymer | | |
|---|---|---|---|
| | | molecular weight (g/mol) | content (parts by weight) | Tg (° C.) |
| Example 1 | Preparation Example 1 | 40,000 | 5 | 50 |
| Example 2 | Preparation Example 1 | 40,000 | 10 | 50 |
| Example 3 | Preparation Example 2 | 50,000 | 10 | 50 |
| Example 4 | Preparation Example 3 | 50,000 | 10 | 40 |
| Comparative Example 1 | Preparation Example 1 | 40,000 | 0 | 50 |
| Comparative Example 2 | Preparation Example 1 | 40,000 | 30 | 50 |
| Comparative Example 3 | Preparation Example 4 | 500 | 7 | 50 |
| Comparative Example 4 | Preparation Example 5 | 40,000 | 7 | −20 |
| Comparative Example 5 | Preparation Example 6 | 100,000 | 7 | 50 |

Experimental Example

The evaluation results of the properties of the adhesive tapes according to Examples 1 to 4 and Comparative Examples 1 to 5 are shown in Table 2 as below.

TABLE 2

| | step coverage | Reworkability | Peeling strength |
|---|---|---|---|
| Example 1 | ○ | ○ | ○ |
| Example 2 | ◎ | ○ | ○ |
| Example 3 | ◎ | ○ | ○ |
| Example 4 | ◎ | ○ | ○ |
| Comparative Example 1 | Δ | ○ | Δ |
| Comparative Example 2 | ◎ | X | ◎ |
| Comparative Example 3 | X | Δ | X |
| Comparative Example 4 | ◎ | X | Δ |
| Comparative Example 5 | ◎ | X | Δ |

Evaluation of Step Coverage Performance

The prepared multilayer adhesive tape was attached on a glass substrate of 1.1 T thickness having a bezel part with a printing step difference of 20 μm and a screen part without a printing step difference, and a 0.55 T glass substrate was laminated thereon. The result was placed in an autoclave at 40° C. and 4 bar for 20 minutes. Then, the step coverage thereof was evaluated by confirming the number of bubbles generated due to the inability to sufficiently overcome the step difference at the four vertexes of the bezel part and the delayed bubbles in the screen part after 24 hours. Specifically, when the number of delayed bubbles is 1 or less, it is evaluated as ◎. When the number of delayed bubbles is 2 and delayed bubbles weakly occur, it is evaluated as ○. When the number of delayed bubbles is 3 and delayed bubbles strongly occur, it is evaluated as Δ. When the number of delayed bubbles is 4 or more and delayed bubbles strongly occur, it is evaluated as X.

Evaluation of Reworkability

The prepared multilayer adhesive tape was attached on a glass substrate of 1.1 T thickness having a bezel part with a printing step difference of 20 μm and a screen part without a printing step difference. The result was placed in an autoclave at 40° C. and 4 bar for 20 minutes. Then, the result was placed at a room temperature for 24 hours. When the multilayer adhesive tape is removed at a time without breaking the multilayer adhesive tape, it is evaluated as ◎. When the multilayer adhesive tape is cut off, but the removal operation is necessary to be repeated not more than 5 times, it is evaluated as ○. When the multilayer adhesive tape is easily cut off, and the removal operation is necessary to be repeated 6 times or more, it is evaluated as Δ. When the multilayer adhesive tape is easily cut off, and the removal operation is impossible, it is evaluated as X.

Evaluation of Peeling Strength

The prepared multilayer adhesive tape was backed to a polyethylene terephthalate (PET) film and then attached to a glass substrate of 1.1 T thickness using a 2 kg roller. The result was placed in an autoclave (60° C. and 7 bar) for 30 minutes. Then, the peeling strength thereof was evaluated by ASTM D903 at a peeling angle of 180 degrees under a constant temperature of 25° C. and a constant humidity of 25 RH %. When the peeling strength is 2,500 g/in or more, it is evaluated as ◎. When the peeling strength is 2,000 g/in or more and less than 2,500 g/in, it is evaluated as ○. When the peeling strength is 1,500 g/in or more and less than 2,500 g/in, it is evaluated as Δ. When the peeling strength is less than 1,500 g/in, it is evaluated as X.

According to the results shown in Table 2, it was confirmed that the adhesive tapes according to Examples 1 to 4 were excellent in step coverage, reworkability, and adhesive strength.

On the contrary, it was confirmed that the step coverage and peeling strength of Comparative Example 1 in which the low molecular weight prepolymer was not used, were inferior to those in Examples. Further, Comparative Example 2, which used the excessively low molecular weight prepolymer, had poor reworkability so that there was a problem that the tape was not easily removed from the adherend when rework was required. Further, Comparative Example 3, which used the low molecular weight prepolymer having an excessively low weight average molecular weight had a problem of poor step coverage, reworkability, and peeling strength. Further, Comparative Example 4, which used the low molecular weight prepolymer having the excessively low glass transition temperature had a problem that the reworkability was very poor and the peeling strength also was weak. Furthermore, Comparative Example 5, which used the low molecular weight prepolymer having the excessively high weight average molecular weight had a problem that the reworkability was very poor and the peeling strength also was weak.

The invention claimed is:

1. A multilayer adhesive tape sequentially comprising:
    a first outer adhesive layer;
    a second outer adhesive layer;
    an intermediate adhesive layer;
    a first interface mixed layer provided between the first outer adhesive layer and the intermediate adhesive layer; and
    a second interface mixed layer between the second outer adhesive layer and the intermediate adhesive layer,
    wherein the first interface mixed layer comprises materials from the first outer adhesive layer and the intermediate adhesive layer,
    wherein at least one of the first outer adhesive layer or the second outer adhesive layer includes a cured product of an outer adhesive composition including a high molecular weight prepolymer having a weight average molecular weight of 100,000 g/mol or more and 1,500,000 g/mol or less and a low molecular weight prepolymer having a weight average molecular weight of 1,000 g/mol or more and 80,000 g/mol or less, wherein the low molecular weight prepolymer includes a polymerized unit of a cycloalkyl group-containing (meth)acrylate monomer and the content of the polymerized unit of the cycloalkyl group-containing (meth)acrylate monomer is 50 parts by weight or more and 90 parts by weight or less with respect to 100 parts by weight of total polymerized units of the low molecular weight prepolymer.

2. The multilayer adhesive tape of claim 1, wherein a glass transition temperature of the low molecular weight prepolymer is between 0° C. or more and 80° C. or less.

3. The multilayer adhesive tape of claim 1, wherein the low molecular weight prepolymer includes a polymerized unit of photopolymerizable functional group-containing (meth)acrylate monomers.

4. The multilayer adhesive tape of claim 3, wherein the photopolymerizable functional group-containing (meth)acrylate monomer is a (meth)acrylate monomer having at least one photopolymerizable functional group selected from the group consisting of a benzophenone-based functional group, a quinone-based functional group and a thioxanthone-based functional group bonded.

5. The multilayer adhesive tape of claim 3, wherein a content of the polymerized unit of the photopolymerizable functional group-containing (meth)acrylate monomers is between 0.01 part by weight or more and 10 parts by weight or less with respect to 100 parts by weight of total polymerized units of the low molecular weight prepolymer.

6. The multilayer adhesive tape of claim 1, wherein a content of the low molecular weight prepolymer is between 1 part by weight or more and 25 parts by weight or less with respect to 100 parts by weight of the high molecular weight prepolymer.

7. The multilayer adhesive tape of claim 1, wherein the high molecular weight prepolymer includes:
    at least one polymerized unit of (meth)acrylate monomers selected from the group consisting of a polymerized unit of alkyl group-containing (meth)acrylate monomers or a polymerized unit of heterocycloalkyl group-containing (meth)acrylate monomers; and
    a polymerized unit of polar functional group-containing monomers.

8. The multilayer adhesive tape of claim 7, wherein a content of the polymerized unit of the heterocycloalkyl group-containing (meth)acrylate monomers is between 1 part by weight or more and 15 parts by weight or less with respect to 100 parts by weight of total polymerized units of the high molecular weight prepolymer.

9. The multilayer adhesive tape of claim 7, wherein a content of the polymerized unit of the polar functional group-containing monomers is between more than 0 part by weight and 20 parts by weight or less with respect to 100 parts by weight of total polymerized units of the high molecular weight prepolymer.

10. The multilayer adhesive tape of claim 1, wherein a glass transition temperature of the first outer adhesive layer and the second outer adhesive layer is −60° C. or more and −20° C. or less, respectively.

11. The multilayer adhesive tape of claim 1, wherein the intermediate adhesive layer includes an intermediate adhesive polymer including:
    a polymerized unit of an alkyl group-containing (meth)acrylate monomers;
    a polymerized unit of a cycloalkyl group-containing (meth)acrylate monomers; and
    a polymerized unit of a polar functional group-containing monomers.

12. The multilayer adhesive tape of claim 1, wherein a thickness of the intermediate adhesive layer is between 30 μm or more and 100 μm or less.

13. The multilayer adhesive tape of claim 1, wherein a thickness of the first outer adhesive layer and the second outer adhesive layer is 25 μm or more and 60 μm or less, respectively.

14. The multilayer adhesive tape of claim 1, wherein the second interface mixed layer comprises materials from the second outer adhesive layer and the intermediate adhesive layer.

15. The multilayer adhesive tape of claim 1, wherein a glass transition temperature of the intermediate adhesive layer is between −40° C. or more and 0° C. or less.

* * * * *